United States Patent
Sailor et al.

(10) Patent No.: US 7,899,802 B2
(45) Date of Patent: Mar. 1, 2011

(54) MOVEABLE INTERFACE TO A SEARCH ENGINE THAT REMAINS VISIBLE ON THE DESKTOP

(75) Inventors: Janet Sailor, San Leandro, CA (US); Ruth Lim, Santa Clara, CA (US); Anthony Reyes, San Francisco, CA (US); Geoffrey Martin, Scotts Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1308 days.

(21) Appl. No.: 10/835,353

(22) Filed: Apr. 28, 2004

(65) Prior Publication Data

US 2005/0246655 A1    Nov. 3, 2005

(51) Int. Cl.
G06F 7/00 (2006.01)
G06F 3/00 (2006.01)

(52) U.S. Cl. .................... 707/706; 707/707; 715/788

(58) Field of Classification Search ............... 707/3, 707/102, 706, 707; 715/788
See application file for complete search history.

(56) References Cited

U.S. PATENT DOCUMENTS

| | | | |
|---|---|---|---|
| 5,434,965 A | 7/1995 | Matheny et al. | |
| 5,530,865 A | 6/1996 | Owens et al. | |
| 5,596,702 A | 1/1997 | Stucka et al. | |
| 5,745,111 A | 4/1998 | Cline et al. | |
| 5,898,434 A | 4/1999 | Small et al. | |
| 5,905,493 A * | 5/1999 | Belzer et al. | 715/835 |
| 6,262,724 B1 | 7/2001 | Crow et al. | |
| 6,342,905 B1 | 1/2002 | Diedrich et al. | |
| 6,408,344 B1 | 6/2002 | Sakai | |
| 6,446,065 B1 * | 9/2002 | Nishioka et al. | 707/5 |
| 6,452,609 B1 | 9/2002 | Katinsky et al. | |
| 6,483,523 B1 | 11/2002 | Feng | |
| 6,587,127 B1 | 7/2003 | Leeke et al. | |
| 6,731,312 B2 | 5/2004 | Robbin | |
| 7,003,726 B2 | 2/2006 | Walker et al. | |
| 7,020,704 B1 | 3/2006 | Lipscomb et al. | |
| 7,039,643 B2 | 5/2006 | Sena et al. | |
| 7,062,453 B1 | 6/2006 | Clarke | |
| 7,395,957 B2 | 7/2008 | Satake | |
| 2001/0021934 A1 * | 9/2001 | Yokoi | 707/500 |
| 2001/0056434 A1 | 12/2001 | Kaplan et al. | |
| 2002/0059342 A1 | 5/2002 | Gupta et al. | |

(Continued)

OTHER PUBLICATIONS

Skiljan, Irfan "Irfan View, Iview390.pdf", (Apr. 2004),12 pages.

(Continued)

*Primary Examiner*—Etienne P LeRoux
*Assistant Examiner*—Cindy Nguyen (57) ABSTRACT

Methods and systems for a moveable search engine interface that remains visible on the desktop are provided. In one embodiment, a search engine interface is created by displaying a graphical image of a window on a screen of the computer. The window may receive search terms for searching information available to a search engine. The search engine interface is also created by associating a two dimensional graphical image that has a specified shape and color with the window. The search engine interface is designed to remain available on the screen of the computer regardless of whether a browser associated with the computer is open or closed. Further the search engine interface is designed to be moved anywhere on the screen.

21 Claims, 4 Drawing Sheets

U.S. PATENT DOCUMENTS

| | | |
|---|---|---|
| 2002/0065849 A1 | 5/2002 | Ferguson et al. |
| 2002/0082730 A1 | 6/2002 | Capps et al. |
| 2002/0089530 A1 | 7/2002 | Markel |
| 2002/0118220 A1* | 8/2002 | Lui et al. ............... 345/709 |
| 2002/0135617 A1* | 9/2002 | Samid ................ 345/764 |
| 2002/0149618 A1 | 10/2002 | Estrada |
| 2002/0169797 A1 | 11/2002 | Hegde et al. |
| 2002/0180803 A1 | 12/2002 | Kaplan et al. |
| 2002/0194151 A1 | 12/2002 | Fenton et al. |
| 2002/0196286 A1 | 12/2002 | Taylor et al. |
| 2003/0007003 A1 | 1/2003 | Ostrowski et al. |
| 2003/0014477 A1 | 1/2003 | Oppenheimer et al. |
| 2003/0076345 A1 | 4/2003 | Feller et al. |
| 2003/0090516 A1 | 5/2003 | Stein |
| 2003/0120599 A1 | 6/2003 | Agboatwalla et al. |
| 2003/0128228 A1 | 7/2003 | Crow et al. |
| 2003/0132970 A1 | 7/2003 | Lehmeier et al. |
| 2003/0137531 A1 | 7/2003 | Katinsky et al. |
| 2003/0170006 A1 | 9/2003 | Bogda et al. |
| 2003/0221167 A1* | 11/2003 | Goldstein et al. ............ 715/513 |
| 2003/0233425 A1* | 12/2003 | Lyons et al. ............... 709/217 |
| 2004/0002945 A1* | 1/2004 | Shibata ................ 707/1 |
| 2004/0003347 A1 | 1/2004 | Saidenberg et al. |
| 2004/0021684 A1 | 2/2004 | B. Millner |
| 2004/0025112 A1 | 2/2004 | Chasen et al. |
| 2004/0051812 A1 | 3/2004 | Hayward |
| 2004/0059776 A1 | 3/2004 | Pitzel et al. |
| 2004/0061720 A1* | 4/2004 | Weber .................. 345/760 |
| 2004/0064447 A1* | 4/2004 | Simske et al. .............. 707/5 |
| 2004/0070609 A1 | 4/2004 | Estrada |
| 2004/0148362 A1 | 7/2004 | Friedman |
| 2004/0165007 A1* | 8/2004 | Shafron ................. 345/781 |
| 2004/0205333 A1 | 10/2004 | Bjorkengren |
| 2004/0216054 A1 | 10/2004 | Mathews et al. |
| 2004/0243694 A1 | 12/2004 | Weast |
| 2004/0268261 A1 | 12/2004 | Elliott et al. |
| 2004/0268413 A1 | 12/2004 | Reid et al. |
| 2005/0010589 A1 | 1/2005 | Novak et al. |
| 2005/0021935 A1 | 1/2005 | Schillings et al. |
| 2005/0042591 A1 | 2/2005 | Bloom et al. |
| 2005/0044508 A1 | 2/2005 | Stockton |
| 2005/0044560 A1 | 2/2005 | Kryeziu |
| 2005/0065913 A1 | 3/2005 | Lillie et al. |
| 2005/0069225 A1 | 3/2005 | Schneider et al. |
| 2005/0097089 A1* | 5/2005 | Nielsen et al. .............. 707/3 |
| 2005/0154717 A1 | 7/2005 | Watson et al. |
| 2005/0278698 A1* | 12/2005 | Verco ................ 717/116 |

OTHER PUBLICATIONS

"Startup Program Loading", (Load.pdf), (Jun. 26, 2004), 6 pages.

"Media Player Classic", ver. 6.4.7.3, (2002-2003), screen caps fig. 1-fig. 7.

* cited by examiner

- 302 A GRAPHICAL IMAGE OF A WINDOW IS CREATED FOR DISPLAY ON A SCREEN.
- 304 A TWO DIMENSIONAL GRAPHICAL IMAGE IS ASSOCIATED WITH THE WINDOW.
- 306 THE SEARCH ENGINE INTERFACE IS ENABLED TO REMAIN AVAILABLE ON THE SCREEN.
- 308 THE SEARCH ENGINE INTERFACE IS ENABLED TO BE MOVED ANY WHERE ON THE SCREEN.
- 310 A LIST OF SEARCH ENGINE NAMES ARE ASSOCIATED WITH THE SEARCH ENGINE INTERFACE.
- 312 THE SEARCH ENGINE IS INVOKED THAT CORRESPONDS TO THE SEARCH ENGINE NAME A USER SELECTED.
- 314 RESULTS OF A SEARCH ARE RETURNED IN A BROWSER WINDOW.

FIG. 4

MOVEABLE INTERFACE TO A SEARCH ENGINE THAT REMAINS VISIBLE ON THE DESKTOP

RELATED APPLICATIONS

This patent application claims priority to and incorporates the contents of the U.S. Provisional Patent Application No. 60/508,439 entitled "A Novel Customizable User Interface For One Click Access to Local and Online Contents" by Martin, G et al., filed on Oct. 3, 2003.

TECHNICAL FIELD

Embodiments of the present invention relate to graphical interfaces. More specifically, embodiments of the present invention relate to an interface for a search engine that can be moved anywhere on a desktop and remains visible on the desktop as long as the computer is on.

BACKGROUND ART

Figure 1:
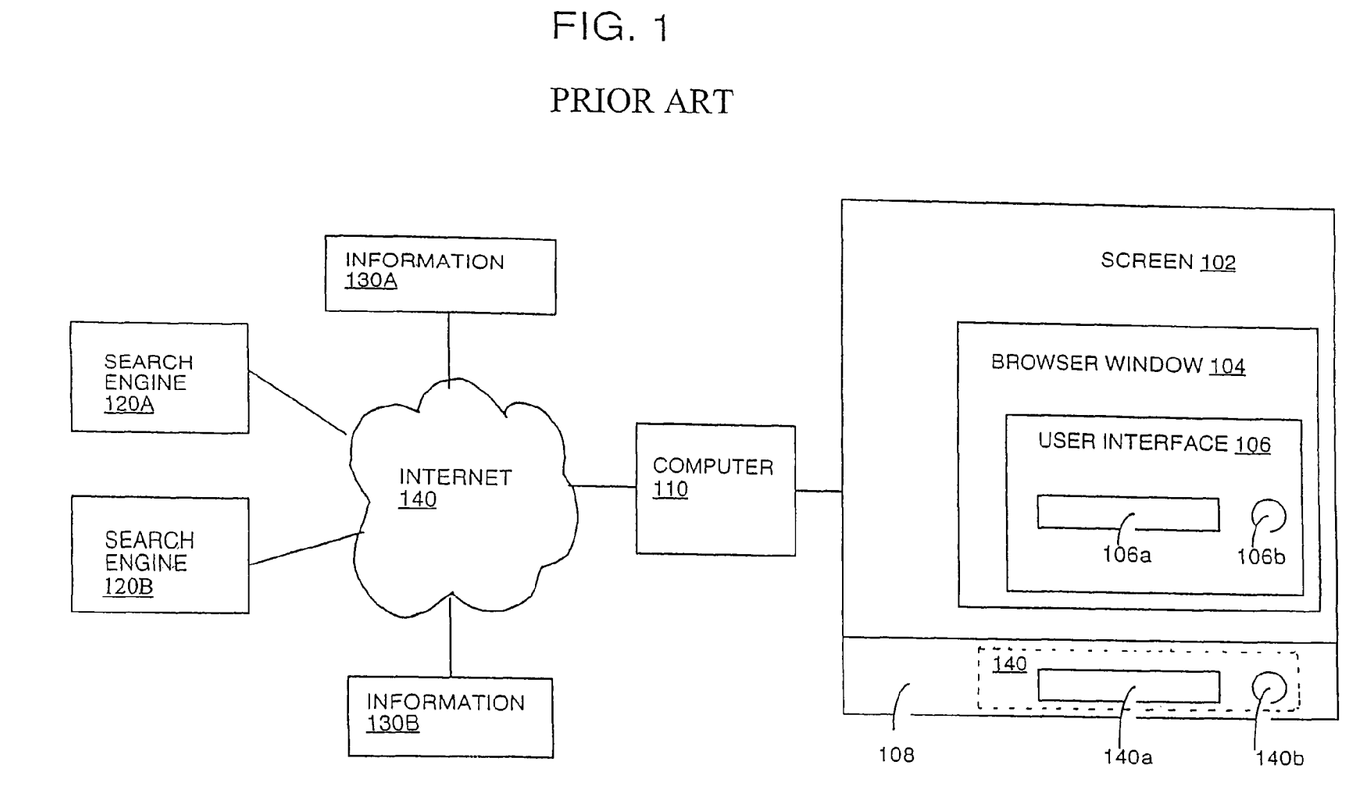
FIG. 1 depicts a block diagram of prior art interfaces to using search engines for finding information on the Internet.

With the advent of the World Wide Web (WWW) an abundance of information on the Internet has become available to people who have computers. Search engines have been developed to find information based on search terms that the users provide to the search engines. FIG. 1 depicts a block diagram of prior art interfaces for using search engines to find information on the Internet. For example, typically, users open a browser window 104 on a screen 102 of their computer 110, type the URL of the search engine 120A they want to use in order to display a user interface 106 for that particular search engine 120A. The user interface 106 will have one or more fields 106a for entering search terms. The user may instruct the search engine 120A to perform the search of information 130A associated with the search engine 120A based on the entered search terms when the user clicks on a button 106b.

Different search engines (120A, 120B) have access to different sets of information (130A, 130B) on the Internet 140. For example, search engine 120A may have access to information 130A, which may include, for example, the contents of the Wall Street Journal, whereas search engine 120B may have access to information 130B, which may include, for example, the contents of Time magazine. Each search engine (120A, 120B) searches the information (130A, 130B) that it has access to based on search terms the user enters and provides results from the search to the user in the browser window 104. For example, search engine A would search information 130A and search engine B would search information 130B. The information each search engine has access to shall be referred to as the search engine's "environment."

One problem with search engine user interfaces 106 is that they disappear when the user closes their browser window 104. A second problem with the search engine user interfaces 106 is that they take up a lot of space on the screen 102.

Referring to FIG. 1, free ware called "Dave's Quick Search", which can be found at "notesbydave.com/toolbar/" has addressed this problem by providing a user interface 140 (referred to hereinafter as "Dave's user interface") as a part of the task bar 108. Dave's user interface 140 provides a small window 140a that users can enter search terms into and a button 140b that users can click on to instruct the user's default search engine to perform a search based on the search terms currently in the window 140a.

One problem with Dave's user interface 140 is that it takes up valuable space on the task bar 108.

For these and other reasons, a method and/or a system would be valuable that provides a search engine user interface that is available as long as the user's computer is on regardless of whether the browser is open. A method and/or system that does not take up valuable space on the task bar would also be value.

DISCLOSURE OF THE INVENTION

Embodiments of the present invention are described which pertain to methods and systems for a movable interface to a search engine that remains visible on a desktop regardless of whether a browser is open or closed. In one embodiment, a search engine interface is created by displaying a graphical image of a window on a screen of the computer. The window may receive search terms for searching information available to a search engine. The search engine interface is also created by associating a two dimensional graphical image that has a specified shape and color with the window. The search engine interface is designed to remain available on the screen of the computer regardless of whether a browser associated with the computer is open or closed. Further the search engine interface is designed to be moved anywhere on the screen.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Software System and Functional Overviews

Figure 2:
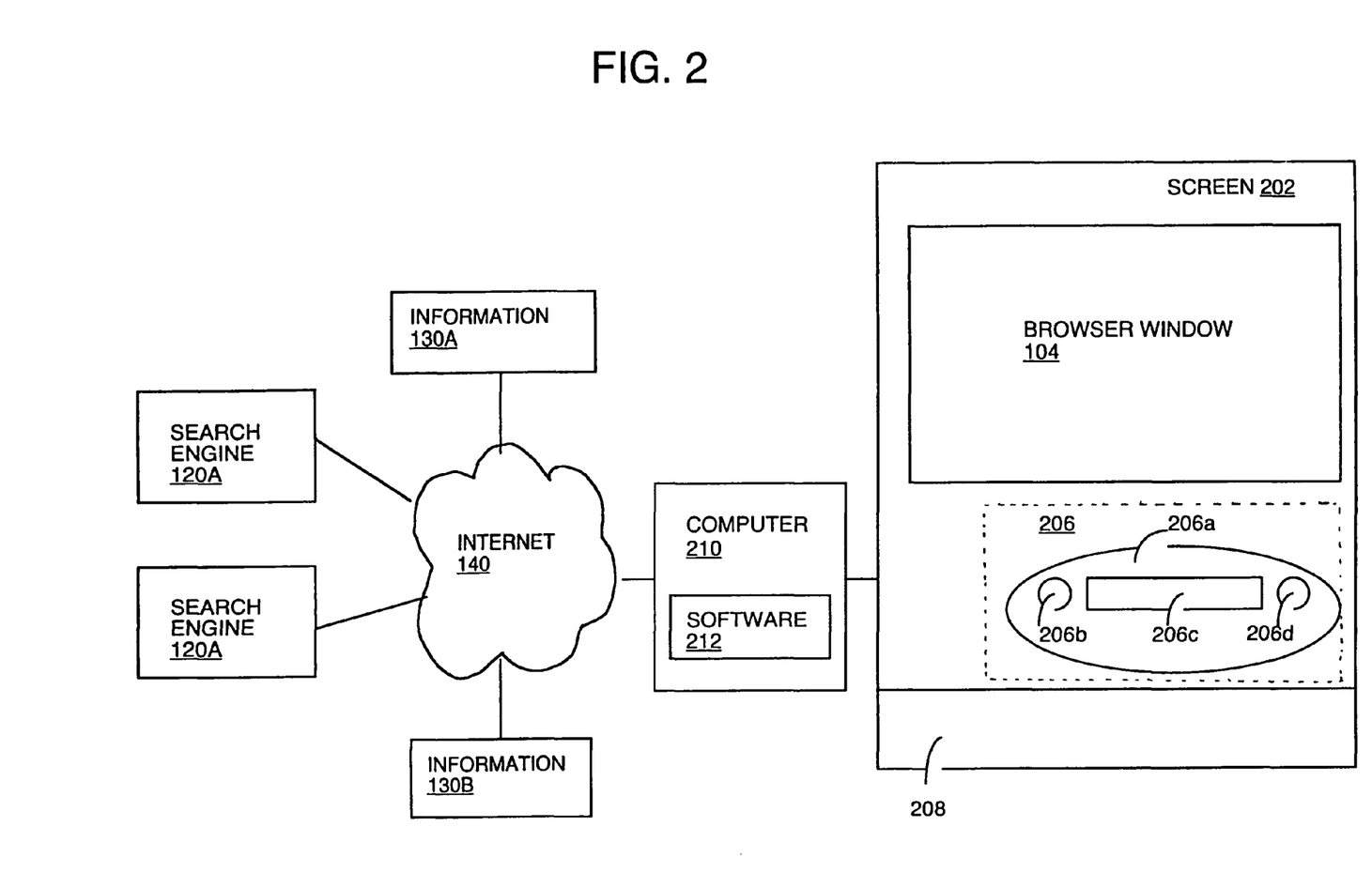
FIG. 2 is a block diagram of an exemplary software system in which embodiments of the present invention can be implemented.

FIG. 2 is a block diagram of an exemplary software system in which embodiments of the present invention can be implemented. The blocks in FIG. 2 can be arranged differently than as illustrated, and can implement additional features that are not described herein. Further, the blocks in FIG. 2 are not necessarily drawn to scale.

The software system 200 includes a computer 210 that communicates with the Internet 140 to perform searches on information (130A, 130B) using search engines (120A, 120B). As depicted in FIG. 2, screen 202 displays a search engine interface 206, a browser window 104, and a task bar 208. Further, according to one embodiment, search engine interface 206 includes a window 206c for entering search terms, button 206b for displaying a list of user selectable search engine names, a search button 206d, and a two dimensional graphical image for enhancing the appearance of search engine interface 206. In yet another embodiment, software 212 executing on computer 210, displays the search engine interface 206 on the screen 202 on computer 210. In one embodiment, software 212 may provide other interfaces and/or services besides displaying search engine interface 206, as will be described in more detail.

A user of computer 210 may interact with search engine interface 206, browser window 104, and task bar 208 to instruct computer 210 on what actions to perform. For example, according to one embodiment, the user may enter search terms into window 206c to cause a search engine (120A, 120B) to search the information (130A, 130B) associated with the search engine (120A, 120B) based on the entered search terms. In response, the results of the search may be returned in a browser window 104.

According to one embodiment, the search engine interface 206 remains available on the screen 202 for searching information (130A, 130B) available to search engines (120A, 120B) even when the browser window 104 is closed. For example, referring to FIG. 1, since browser window 104 has to be open to display user interface 106, user interface 106 will disappear when browser window 104 is closed. In contrast, referring to FIG. 2, by associating the user interface 206 with the "desktop" or screen 202, search engine interface 206 is available for receiving search terms regardless of whether browser window 104 is open or closed. If browser window 104 is closed when a user instructs a search engine (120A, 120B) to perform a search with search engine interface 206, a browser window 104 may be opened to display the results of the search, according to one embodiment.

According to another embodiment, search engine interface 206 may be moved any where on screen 202. For example, referring to FIG. 1, Dave's search interface 140 is located on the task bar 108 and therefore it cannot be moved around. In contrast, referring to FIG. 2, search engine interface 206 may be moved to the left, the right, up or down on the screen 202. In fact, according to one embodiment, search engine interface 206 may be moved so that it is almost entirely off the screen 202.

In yet another embodiment, the user may select which search engine (120A, 120B) performs the search using a list of search engines names. For example, assume that the name of search engine 120A is Google™ and the name of search engine 120B is Alta Vista. A user may click on a button 206b to cause a list which includes two user selectable options, e.g., "Google" and "Alta Vista™", to be displayed. The user may cause Google™ to perform the search by selecting the option "Google" from the list and clicking on button 206d.

Any language, tool kit, and/or library that may be used for displaying graphical images, receiving search terms, communicating search terms to search engines, and for receiving the results of a search, may be used for creating search engine interface 206. For example, C++, Pascal, Visual Basic, Microsoft Foundation Classes (MFC), Java Script, Viassory, may be used for coding software 212 which creates search engine interface 206 when software 212 is executed.

List of Search Engine Names

According to one embodiment, a user may cause the search engine interface 206 to display a list of user selectable search engine names by clicking on button 206b. For example, the company that owns the software that creates search engine interface 206 may create a partnership with several companies, such as Google™, AltaVista™, Ask Jeeves®, Inktomi®, etc., that have search engines, they may allow users to select the search engine the users desire from among the companies the owner of software 212 partnered with. In this case, a list of names for the search engines, e.g., Google™, AltaVista™, Ask Jeeves®, Inktomi®, may be displayed for user selection when a user clicks on button 206b.

In yet another embodiment, an option for searching the hard drive of computer 210 may be associated with the list of search engine names. For example, an option such as "My Computer" may be displayed when a user clicks on button 206b. If the user chooses the "My Computer" option, another interface may be displayed asking the user what they want to search for on their computer 210's hard drive. In this case, the interface may allow the user to search for a particular file name or for a word in all of the files on computer 210's hard drive. In one embodiment, the interface that is displayed when a user chooses the "My Computer" option is the interface for performing searches of whatever operating system is running on computer 210. In another embodiment, the company that owns search engine interface 206 may develop their own interface for allowing users to search their hard drive. In this case, an Application Programming Interface (API) provided by the operating system may be used to instruct the operating system to perform the search.

In one embodiment, multiple search engines may be used for performing searches (also referred to as "aggregate searches"). For example, a user may be allowed to select the name of more than one search engine. Assume in this case that the list of search engine names includes Google™, AltaVista™, and Ask Jeeves®. The user may be allowed to select Google™ and Ask Jeeves® to perform the search. Additionally, the user may be allowed to perform a search using all of the search engines in the list.

What are known as search engine aggregators, such as "www.dogpile.com," have the ability to search information on the internet using multiple search engines. For example, in one embodiment, the company that owns the search engine interface 206 may contract with a search engine aggregator, such as "www.dogpile.com" to perform aggregate searches.

In another embodiment, the results from a search may be returned in a browser window associated with the search engine that performed the search. In yet another embodiment, the results may be returned in an interface associated with the search engine interface 206. For example, the results that the search engines found may be returned to software 212 in data structures, such as XML feeds. The software 212 may extract the results from the data structures and display the results in an interface that is associated with the software 212. According to one embodiment, the interface that is used to provide results from a search may be displayed as a part of a browser window 104, as depicted in FIG. 2.

In one embodiment, the names of search engines are easily added and/or deleted from the list of search engine names. For example, the names of the search engines may be associated with button 206b using an INI file, a registry, a text file, a proprietary data format, an XML file, among other things.

Two Dimensional Graphical Images

According to one embodiment, the appearance of the search engine interface 206 may be modified by associating a different two dimensional graphical image with the search engine interface 206. For example, as depicted in FIG. 2, the two dimensional graphical image 206a that is associated with the search engine interface 206 is an oblong shape. However, the shape and color of the two dimensional image 206a could be any shape or color. For example, the two dimensional image 206a could have the shape of a heart, square, circle, triangle, a base ball bat, race car, etc. Further, the two dimensional image 206a could be any color such as green, blue, red, yellow, etc.

In yet another embodiment, different two dimensional graphical images 206a may be associated with different search engines (120A, 120B). For example, if a user chooses Google™ from the list of search engine names, then a two dimensional graphical image 206a with Google™'s logo may appear and when the user chooses Alta Vista from the list of search engine names, then a different two dimensional graphical image 206a with Alta Vista's logo may appear.

According to one embodiment, the company that owns search engine interface 206 develops the two dimensional graphical images 206a that can be used for modifying the appearance of the search engine interface 206. The two dimensional graphical images 206a may be shipped as a part of software 212. According to another embodiment, user communities may develop the two dimensional graphical images 206a. In this case, software 212 may provide a facility for associating the two dimensional graphical images 206a with the search engine interface 206.

Operational Example

Figure 3:
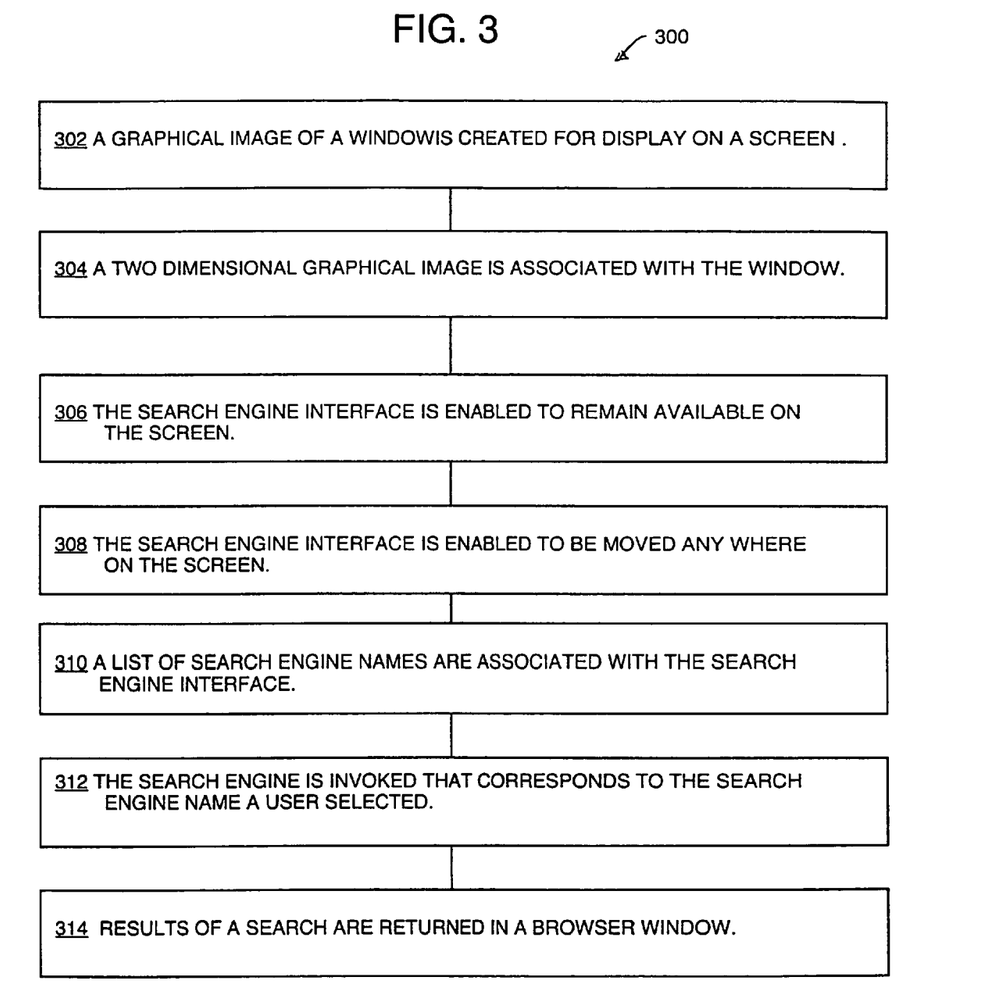
FIG. 3 depicts a flowchart for creating a search engine interface according to embodiments of the present invention.

FIG. 3 depicts flowchart 300 for creating a search engine interface according to embodiments of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed. All of, or a portion of, the embodiments described by flowchart 300 can be implemented using computer-readable and computer-executable instructions which reside, for example, in computer-usable media of a computer system or like device. In the present embodiment, steps depicted in flowchart 300 may be implemented by the software 212 of FIG. 2.

For the purposes of illustration, the discussion of flowchart 300 shall refer to the structures depicted in FIG. 2. Further, for the purposes of illustration, assume that the software 212 was created with Microsoft Foundation Classes (MFC).

In step 302, a graphical image of a window is created for display on a screen. For example, a search engine interface 206 may be created, at least in part, by using the windows class of MFC to create an object that represents window 206c. For the purposes of explanation, assume that the object that represents window 206c is a part of software 212. Additionally, MFC may be used to create button 206b and button 206d. When software 212 as well as object are executed on computer 210, search engine interface 206, which includes button 206b, window 206c, and search button 206d are displayed on the screen 202 of computer 210.

In step 304, a two dimensional graphical image is associated with the window. For example, bit maps may be used to create two dimensional graphical images 206c that have a specified shape and color. MFC may be used to associate these bit maps with the window 206c. For example, assume that a particular bitmap forms a blue oval. If this particular bit map is associated with window 206c then when software 212 is executed on computer 210, it would display a two dimensional graphical image 206c that is a blue oval.

In step 306, the search engine interface is enabled to remain available on the screen. For example, by coding software 212 in a way that search engine interface 206 may be associated with computer 210's screen 202, also known as the "desktop", when software 212 is executed on computer 210, the search engine interface 206 may remain available to receive search terms regardless of whether a browser window 104 is open or closed.

In step 308, the search engine interface is enabled to be moved any where on the screen. For example, by coding software 212 in a way that search engine interface 206 will be associated with computer 210's screen 202 when software 212 is executed on computer 210, the search engine interface 206 may be moved anywhere on screen 202.

In step 310, a list of search engine names are associated with the search engine interface. For example, by putting a list of search engine names, such as Google™, Alta Vista™, and Inktomi®, in an INI file and associating the INI file with button 206b when software 212 is coded, a list of search engine names may be associated with search engine interface 206 when software 212 is executed on computer 210. According to one embodiment, MFC may be used to associate the list of search engine names with the button 206b of the search engine interface 206.

In step 312, the search engine is invoked that corresponds to the search engine name a user selected. For example, after software 212 is installed on computer 210 causing the display of the search engine interface 206 on screen 202, a user may decide to use search engine interface 206. Assume that the user wants to search for information on "cats" on Google™. The user may enter the search term "cats" into window 206c. Software 212 may be coded in a way that when the user clicks on button 206b, a list that includes user selectable options "Google," "Alta Vista," and "Inktomi" is displayed. Continuing the example, assume the user selects "Google" and clicks on button 206d to start the search. The software 212 uses the URL of Google™, "www.google.com" to locate Google™'s search engine. A string, which includes Google™'s URL and the search term, e.g., "www.google.com?cats", are passed to the Google™'s search engine. In one embodiment, a promotion code for the company that developed software 212 may also be a part of the string that is passed to Google™'s search engine to facilitate any kind of agreements that may have been made between Google™ and the company that owns search engine interface 206. Assuming that Google™ is search engine 120A in FIG. 2, Google™ would search information 130A for information on cats.

In step 314, the results of the search are returned in a browser window. For example, in searching information 130A, Google™ may return a list of URLs to documents found on the internet 140 that pertain to "cats." Google™ may then cause the list of URLs or "results" to be displayed in a browser window 104. Software 212 may be coded in a way that if the browser window 104 is not open at the time the user instructed search engine interface 206 to perform the search by clicking on button 206d, then window 104 may be opened to display the results to the user.

According to one embodiment, the types of controls that browser window 104 has is controlled by parameters set by software 212. For example, software 212 may specify whether browser window 104 may resize, have horizontal and/or vertical scroll bars, a back button, etc.

Hardware Overview

Figure 4:
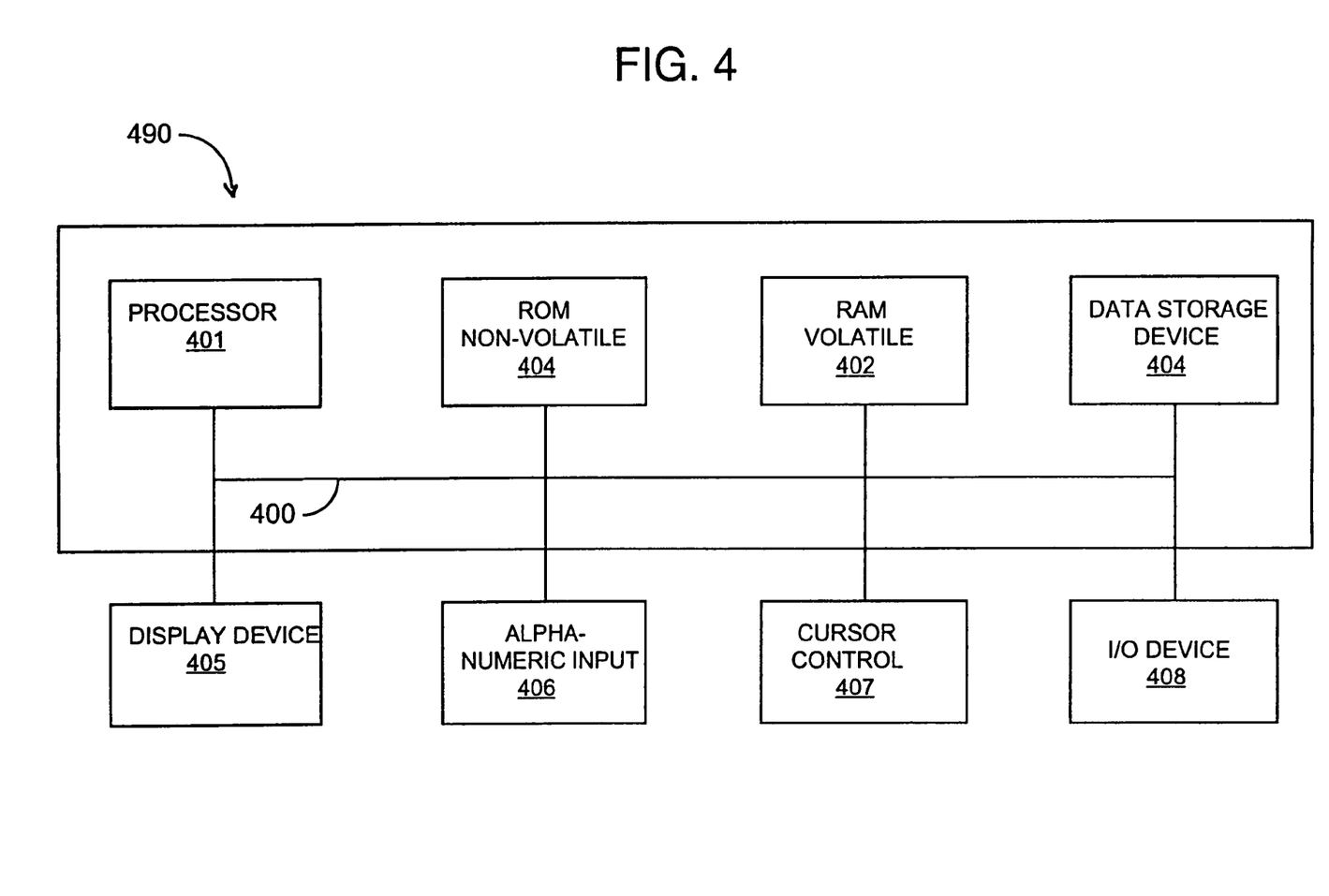
FIG. 4 illustrates an exemplary computer system upon which embodiments of the present invention may be practiced.

FIG. 4 illustrates an exemplary computer system 490 upon which embodiments of the present invention may be practiced. In general, computer system 490 comprises bus 400 for communicating information, processor 401 coupled with bus 400 for processing information and instructions, random access (volatile) memory (RAM) 402 coupled with bus 400 for storing information and instructions for processor 401, read-only (non-volatile) memory (ROM) 403 coupled with bus 400 for storing static information and instructions for processor 401, data storage device 404 such as a magnetic or optical disk and disk drive coupled with bus 400 for storing information and instructions, an optional user output device such as display device 405 coupled to bus 400 for displaying information to the computer user, an optional user input device such as alphanumeric input device 406 including alphanumeric and function keys coupled with bus 400 for communicating information and command selections to processor 401, and an optional user input device such as cursor control device 407 coupled to bus 400 for communicating user input information and command selections to processor 401. Furthermore, an optional input/output (I/O) device 408 is used to couple computer system 490 onto, for example, a network.

Display device 405 utilized with computer system 490 may be a liquid crystal device, cathode ray tube, or other display device suitable for creating graphic images and alphanumeric characters recognizable to the user. Cursor control device 407 allows the computer user to dynamically signal the two-dimensional movement of a visible symbol (pointer) on a display screen of display device 405. Many implementations of the cursor control device are known in the art including a trackball, mouse, joystick or special keys on alphanumeric input device 406 capable of signaling movement of a given direction or manner of displacement. It is to be appreciated that the cursor control 407 also may be directed and/or activated via input from the keyboard using special keys and key sequence commands. Alternatively, the cursor may be directed and/or activated via input from a number of specially adapted cursor directing devices.

In one embodiment, the software 212 may be executed on the computer system 490.

CONCLUSION

In conclusion, search engine interface 206 provides an interface that is quick, easy, and convenient for searching the internet. Search engine interface 206 is the kind of interface that users would want to use frequently and leave on their desktop for a number of reasons.

For example, search engine interface 206 does not take up valuable space either on the task bar or the desktop. Since it is not on the task bar, valuable space is available for other applications on the task bar. Further, since it is compact, it does not take a lot of space on the desktop either. In fact, it can be moved almost entirely off the desktop to provide even more space.

Secondly, leaving the browser open takes up a lot of space on the desktop. Since search engine interface 206 does not require leaving the browser open, more space is available on the desktop.

Thirdly, search engine interface 206 is convenient to use because it provides the essential features necessary for performing a search. For example, search engine interface 206 provides a window 206c for entering search terms, a list of user selectable search engine names, and a button 206d to initiate a search, thus, making it easy and convenient for a user to perform searches.

Fourthly, by providing a list of search engine names, users have the flexibility to choose from a number of search engines for performing searches.

Fifth, search engine interface 206 is convenient because it remains available for user input, whereas, a browser window may be closed.

Also, search engine interface 206 provides commercial benefits to the company that owns the software 212 that creates search engine interface 206. For example, new search engine names may easily be added to the list of search engines names without requiring the recompilation of software 212 or the recompilation of any code associated with the search engines. Thus, it is easy for the company that owns code 212 to enter into new partnerships with companies that own search engines.

Similarly, by making it easy to add new names to the list of search engine names, it would be easy for the company that owns software 212 to sell software 212 to other companies.

What is claimed is:

1. A method of performing a search on a search engine interface on a screen of a computer, the method comprising:
creating a graphical image of a window for display on the screen of the computer, wherein the window may receive search terms for searching information available to a search engine;
associating a two dimensional graphical image with said graphical image of a window for display on the screen of the computer, wherein said two dimensional graphical image has a specified shape and color;
enabling the search engine interface to remain available on the screen for searching information available to the search engine regardless of whether a browser associated with the computer is open or closed;
enabling the search engine interface to be moved anywhere on the screen;
performing an aggregate search of said search terms using a plurality of search engines; and
performing a search based on said search terms of a hard drive associated with said computer.

2. The method of claim 1, wherein the two dimensional graphical image is a first two dimensional graphical image and wherein the method further comprises modifying an appearance of the search engine interface by associating a second two dimensional graphical image with the window.

3. The method of claim 1, wherein the first and the second two dimensional graphical images are bit maps.

4. The method of claim 1, wherein Microsoft's Foundation Class (MFC) is used for creating the search engine interface.

5. The method of claim 1, further comprising associating a list of search engine names with the search engine interface wherein a particular search engine may be selected to perform a search based on search terms entered into the window.

6. The method of claim 5, further comprising associating a selectable option as a part of the list to allow searches of the hard drive of the computer based on the search terms.

7. The method of claim 1, further comprising presenting the search engine interface having the window for display in a region of the screen separate from a task bar also displayed by the screen.

8. A computer system comprising:
a memory unit; and
a processor coupled to the memory unit, the processor configured to:
provide a graphical image representing a search engine interface for display on a screen of the computer system, wherein the search engine interface has a window to receive search terms for searching information available to a plurality of search engines;
cause the search engine interface to remain available on the screen for receiving the search terms even if a browser in the computer system is closed;
enable the search engine interface to be moved anywhere on the screen;
cause performance of an aggregate search of said search terms using the plurality of search engines; and
perform a search based on said search terms of a hard drive of said computer system.

9. The computer system of claim 8, wherein the graphical image is a first two dimensional graphical image and wherein the processor is configured to further modify an appearance of the search engine interface by associating a second two dimensional graphical image with the search engine interface, wherein the second two dimensional graphical image has a different shape or color from the first two dimensional graphical image.

10. The computer system of claim 9, wherein the first and the second two dimensional graphical images are bit maps.

11. The computer system of claim 8, wherein Microsoft's Foundation Class (MFC) is used for creating the search engine interface.

12. The computer system of claim 8, wherein the processor is configured to:
present a list of search engine names with the search engine interface to allow for user selection from among the search engine names; and
receive user selection of multiple ones of the search engine names, wherein the selected multiple search engine names correspond to the plurality of search engines.

13. The computer system of claim 12, wherein the processor is configured to further present a selectable option as a part of the list to allow for user selection of a search of the hard drive based on the search terms.

14. The computer system of claim 8, wherein the processor is configured to further present the graphical image representing the search engine interface for display in a region of the screen separate from a task bar also displayed by the screen.

15. A computer-readable storage medium having computer-readable program code embodied therein for causing a computer system to perform a method of performing a search, the method comprising:
providing a graphical image representing a search engine interface for display on a screen of the computer system, wherein the search engine interface includes a window to receive search terms for searching information available to a plurality of search engines;
enabling the search engine interface to remain available on the screen for receiving the search terms regardless of whether a browser in the computer system is open or closed;
enabling the search engine interface to be moved anywhere on the screen;
cause performance of an aggregate search of said search terms using the plurality of search engines; and
performing a search based on said search terms of a hard drive of said computer system.

16. The computer-readable storage medium of claim 15, wherein the graphical image is a first two dimensional graphical image and wherein the method further comprises modifying an appearance of the search engine interface by associating a second two dimensional graphical image with the search engine interface, wherein the second two dimensional graphical image has a different shape or color from the first two dimensional graphical image.

17. The computer-readable storage medium of claim 15, wherein the first and the second two dimensional graphical images are bit maps.

18. The computer-readable storage medium of claim 15, wherein Microsoft's Foundation Class (MFC) is used for creating the search engine interface.

19. The computer-readable storage medium of claim 15, wherein the method further comprises:
presenting a list of search engine names with the search engine interface to allow for user selection from among the search engine names; and
receiving user selection of multiple ones of the search engine names, wherein the selected multiple search engine names correspond to the plurality of search engines.

20. The computer-readable storage medium of claim 19, wherein the method further comprises presenting a selectable option as a part of the list to allow for user selection of a search of the hard drive based on the search terms.

21. The computer-readable storage medium of claim 15, wherein the method further comprises presenting the graphical image representing the search engine interface for display in a region of the screen separate from a task bar also displayed by the screen.

* * * * *